April 27, 1965        G. TIBERIO        3,180,182

AUTOMATIC PROGRESSIVE TRANSMISSION

Filed Jan. 25, 1963        3 Sheets-Sheet 1

INVENTOR.
GIUSEPPE TIBERIO
BY
ATTORNEY

April 27, 1965 G. TIBERIO 3,180,182
AUTOMATIC PROGRESSIVE TRANSMISSION
Filed Jan. 25, 1963 3 Sheets-Sheet 2

INVENTOR.
GIUSEPPE TIBERIO
BY
*Zoltan Holachek*
ATTORNEY

April 27, 1965 G. TIBERIO 3,180,182
AUTOMATIC PROGRESSIVE TRANSMISSION
Filed Jan. 25, 1963 3 Sheets-Sheet 3
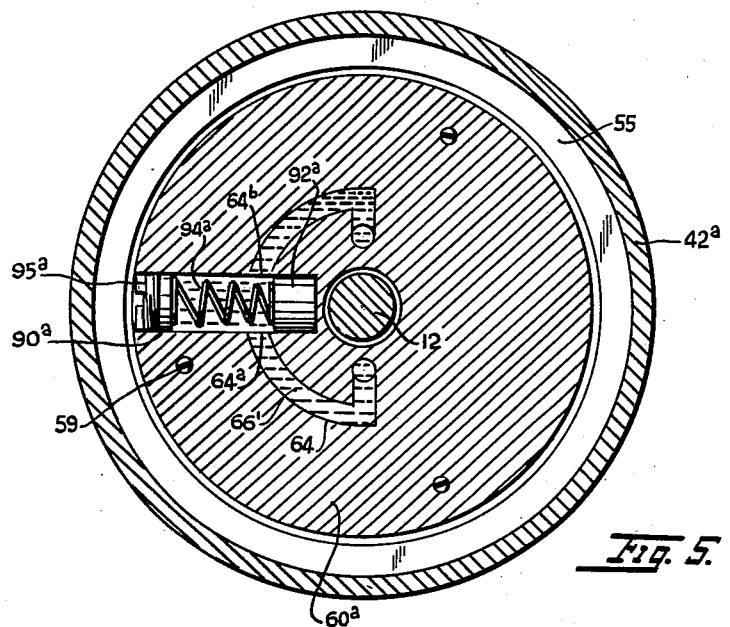
Fig. 5.
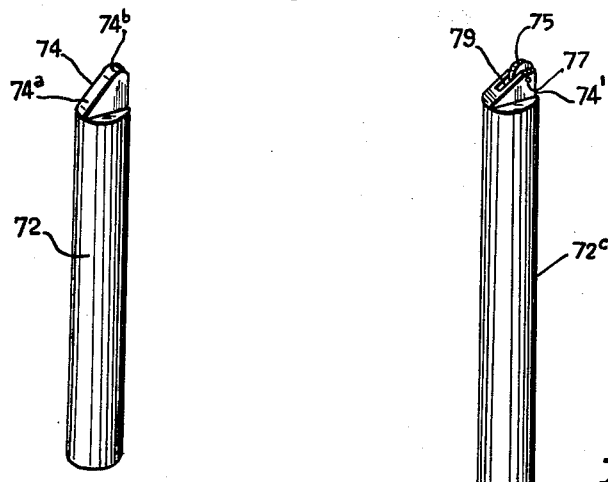
Fig. 6.
Fig. 7.
INVENTOR.
GIUSEPPE TIBERIO
BY
ATTORNEY

United States Patent Office 3,180,182
Patented Apr. 27, 1965

3,180,182
AUTOMATIC PROGRESSIVE TRANSMISSION
Giuseppe Tiberio, 2102 Hudson Blvd., Union City, N.J.
Filed Jan. 25, 1963, Ser. No. 253,846
11 Claims. (Cl. 74—752)

This invention concerns an automatic mechanical transmission system between a drive shaft and a driven shaft.

A principal object of the invention is to provide an automatically operated transmission gear assembly in which the ratio between the speed of the drive shaft and the speed of the driven shaft is automatically varied between infinite and unity.

Another object is to provide a transmission gear assembly as described which is controlled by centrifugal governor means.

A further object is to provide a transmission gear assembly which includes a drum on a driven shaft and buttress gears or ratchets in the drum and piston pawls cooperating with the buttress gears and operatively rotated by the drive shaft.

For further comprehension of the invention, and of the objects and advantages thereof, reference will be had to the following description and accompanying drawings, and to the appended claims in which the various novel features of the invention are more particularly set forth.

Figure 1:
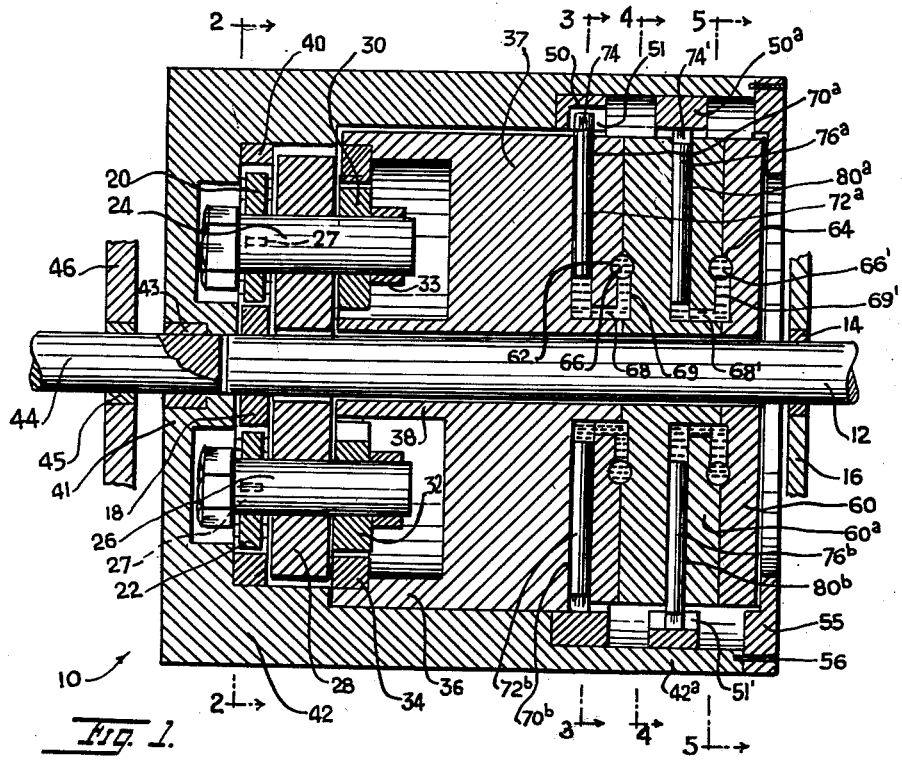

In the accompanying drawings forming a material part of this disclosure:

FIG. 1 is a longitudinal sectional view of a transmission gear assembly embodying the invention.

FIGS. 2, 3, 4 and 5 are cross-sectional views taken on lines 2—2, 3—3, 4—4 and 5—5, respectively, of FIG. 1.

FIG. 6 and FIG. 7 are perspective views of piston pawls which may be used in the assembly.

Referring first to FIGS. 1–5, there is shown the assembly 10 including a drive shaft 12 connected to an engine or motor (not shown). The shaft is rotatably mounted in a bearing 14 of a bearing support 16. Near its free end, the shaft 12 carries a sun gear 18. Two or more satellite pinions 20 and 22 mesh with gear 18. The latter gears are disposed in diametrically opposite locations at gear 18 at one side of disk 28. Pinions 20, 22 are secured to axially parallel bolt pins 24, 26 and are held by keys 27 on the pins. The bolt pins are rotatably carried by disk 28 which is freely rotatable on shaft 12 and is not secured thereto. At the other side of the disk secured to pins 24, 26 are two other pinions 30, 32 which have smaller diameters than pinions 20, 22. Nuts 33 on the pins lock pinions 30, 32 to the pins. Pinions 30, 32 are in mesh at diametrically opposite positions with an internal gear 34 secured to the end edge of a flange 36 of a cylindrical cup 37 mounted on shaft 12. The cup is freely rotatable on shaft 12 and is not secured thereto. The disk 28 and cup 37 are axially aligned with shaft 12. The cup has a tubular hub 38 which serves as a bearing on shaft 12.

Pinions 20 and 22 are in mesh at diametrically opposite positions with an internal gear 40 secured inside and near the closed end 41 of a drum 42. Secured in the closed end 41 of the drum by splines 43 or the like is one end of driven shaft 44. Shaft 44 is journaled in bearing 45 of a bearing support 46. The driven shaft is operatively connected to a suitable load such as wheels of a vehicle, a winch or the like.

Near the open other end 42ª of drum 42 is an internal buttress gear or ratchet gear 50. This gear has teeth 51, each of which has a flat side 52 which is radial with respect to aligned axes of shafts 12 and 44 and drum 42. Adjacent side 54 of each tooth 51 is angularly disposed to the flat side 52; see FIG. 3. A ring 55 is secured by screws 56 to the open end 42ª of the drum 42 to retain cup 37 in the drum. Between ring 55 and gear 50 is another buttress or ratchet gear 50ª. Gear 50ª is offset circumferentially by one half a tooth from gear 50.

Secured to the closed end 58 of the cup by screws 59 is an end plate 60 and an inner plate 60ª. Defined between the plate 60ª and end 58 of the cup is a semicircular duct 62 shown best in FIGS. 1 and 4. The duct contains oil 66 or other suitable liquid. Duct 62 communicates via axial channels 68 and radial channels 69 two radial bores 70ª, 70ᵇ. The bores are diametrically aligned perpendicular to the axis of cup 37. Axially movable in bores 70ª, 70ᵇ are two cylindrical pistons 72ª, 72ᵇ. Outer ends of the pistons are formed with pawls 74 shaped and disposed to engage between the teeth 51 of gear 50. The pistons 72ª, 72ᵇ are spaced apart 180° circumferentially of the gear 50.

Figure 3:
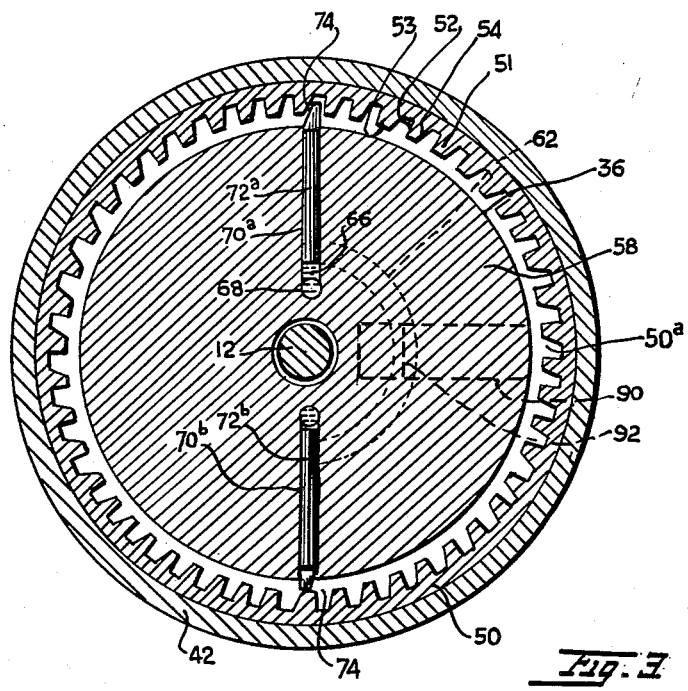
Figure 4:
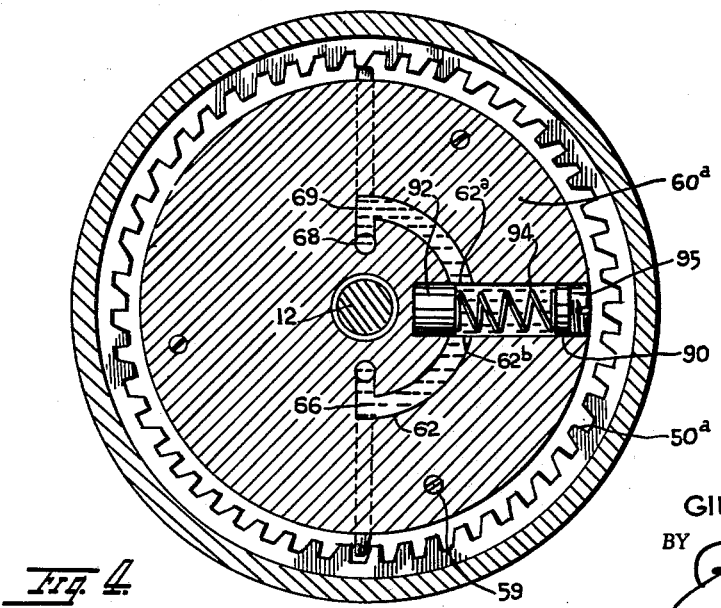

Two other pistons 76ª, 76ᵇ are axially movable in diametrically aligned radial bores 80ª, 80ᵇ formed in plate 60ª; see FIG. 1. Bores 80ª, 80ᵇ are aligned parallel to bores 70ª, 70ᵇ axially of cup 37. The bores 80ª, 80ᵇ communicate with a semicircular duct 64 in which is oil 66′, via axial bores 68′ and radial bores 69′. Pistons 76ª, 76ᵇ have pawls 74′ at their ends which engage between teeth 51′ of the gear 50ª. Gears 50 and 59ª have an odd number of teeth, so that when the pawl of one piston such as piston 72ª is fully engaged in the recess between two teeth 51 as shown in FIGS. 1 and 3, the pawl of the opposite piston 72ᵇ is in contact with the flat or rounded apical end 53 of a tooth diametrically opposite from the recess in which the pawl of piston 72ª is engaged, and vice versa. Pistons 76ª, 76ᵇ are also arranged so that when the pawl of one of these pistons such as piston 76ª is engaged in a recess between two teeth 51′ the other piston 76ᵇ is riding over the apical end of a tooth diametrically opposite from the recess in which piston 76ª is engaged, and vice versa. Also piston 76a is retracted and riding over the edge of a tooth 51′ while piston 72ª is extended between two teeth 51 and vice versa. Similarly, piston 76ᵇ is retracted and riding over the edge of a tooth 51′ while piston 72ᵇ is retracted and vice versa; see FIG. 1.

FIG. 6 clearly shows the cylindrical configuration of a piston 72 with a tapered pawl 74 at its end. The pawl has an inclined face 74a which normally abuts inclined face 53 of a tooth 51 when the pawl is engaged between two teeth of gear 50. The pawl has a rounded end 74ᵇ. Pistons 72ª, 72ᵇ and 76ª 76ᵇ are all constructed in this way.

FIG. 7 shows a piston 72ᶜ with an alternate form of pawl 74′. This pawl has a roller 75 rotatably carried by a pintle 77 with a slot 79 formed in the free end of the pawl. This type of pawl is preferred for heavy duty transmission assemblies.

A radial bore 90 is formed between end 58 of the cup 37 and plate 60ª. This bore has its axis intersecting the duct 62; see FIG. 4. Axially movable in the bore 90 is a cylindrical piston 92. Piston 92 is biased inwardly to the closed end of the bore by a coil spring 94 and the spring is adjustable in tension by a set screw 95 in the outer end of the bore. Normally piston 92 is clear of duct 62 but when the cup 37 rotates the piston 92 moves axially outward under increasing tension in spring 94 to close the duct openings 62ª, 62ᵇ at the bore 90. The piston 92 and spring 94 serves as a governor controlled valve in the transmission assembly.

Another governor controlled valve is provided in the assembly by a cylindrical piston 92ª movable axially in another radial bore 90ª which intersects duct 64 for closing duct openings 64ª, 64ᵇ; see FIG. 5. Bores 90 and 90ª are offset from each other axially of the cup 36 but are located axially 180° apart and in the same dimetral plane. This arrangement is desirable to balance the weight of the rotatable cup structure. Valve piston 92ᵃ is biased inwardly of bore 90ᵃ by a spring 94ᵃ as shown in FIG. 5. A set screw 95ᵃ holds the spring in the bore 90ᵃ and adjusts the tension in the spring. Bores 80ᵃ, 80ᵇ communicate with duct 64 via radial channels 69′ and axial channels 68′. The channels and duct are filled with oil 66′ which extends into bores 80ᵃ, 80ᵇ; see FIGS. 1 and 5.

In operation of the transmission assembly, drive shaft 12 will rotate gear 18. Pinions 20 and 22 will revolve with gear 18. Disk 28 will rotate with pinions 20, 22 and pinions 30, 32 will revolve with pinions 20, 22. Cup 37, which carries internal gear 34, rotates with the revolving pinions 30, 32 meshed with gear 34. The piston pairs 72ᵃ, 72ᵇ and 76ᵃ, 76ᵇ will be revolved with cup 37. The drum 42 will initially be stationary due to its engagement with the loaded driven shaft 44. The pistons in the two pairs will reciprocate alternately. This will be caused by a pumping action which takes place as the piston in each of bores 70ᵃ, 70ᵇ, 80ᵃ, 80ᵇ rides out of a recess between two teeth 51 of gear 50 and moves radially inward of cup 37. This will drive the fluid in the bore through the associated duct 62 or 64 to the communicating bore and force the diametrically opposite piston outward axially between the teeth 51 or 51′ thereat into the recess.

As the speed of rotation of the shaft 12 increases, the valve pistons 92, 92ᵃ move outwardly due to centrifugal force and begin to close the duct openings 62ᵃ, 62ᵇ and 64ᵃ, 64ᵇ. This partially restricts the passage of fluid 66 and 66′ in the ducts and increases the force of engagement of the pawls 74 with gears 50, 50ᵃ. The drum 42 then begins to rotate. As the drive shaft 12 increases further in speed the governor pistons gradually close the duct openings until at a predetermined maximum speed the ducts are entirely closed. No further pumping action of the pistons 72ᵃ, 73ᵇ and 76ᵃ, 76ᵇ can take place so that the pistons lock with gears 50 and 50ᵃ and the driven shaft 44 consequently rotates at the same speed as drive shaft 12.

While the speed of driven shaft 44 is less than that of the drive shaft 12, valve pistons 92 and 92ᵃ are spaced axially from the radially inner ends of bores 90 and 90ᵃ respectively due to the centrifugal forces thereon. Valve piston 92 responds to pumping movement of fluid 66 by vibrating axially as each of pistons 72ᵃ, 72ᵇ in turn slip past the teeth of gear 50 without locking either piston 72ᵃ or 72ᵇ to the gear. Both pistons 72ᵃ, 72ᵇ can slip past respectively engaged teeth of gear 50 simultaneously as fluid 66 causes valve piston 92 to move slightly axially inward of bore 90. Similarly piston 92ᵃ responds to pumping movement of fluid 66′ by moving axially inward of bore 90ᵃ toward its radially inner end as both pistons 76ᵃ and 76ᵇ yieldably engage teeth of gear 50ᵃ and slidably disengage therefrom. The pistons 72ᵃ, 72ᵇ and 76ᵃ, 76ᵇ are fully drivingly engaged with gears 50, 50ᵃ only when pistons 92 and 92ᵃ entirely block pumping movement of fluid 66, 66′ respectively in both bores 90, 90ᵃ. When this bore blockage occurs, and only then, the driven shaft 44 is rotating at the same speed as the drive shaft 12 and the piston 72ᵃ, 72ᵇ, 76ᵃ, 76ᵇ are non-yieldably and fully drivingly engaged with the gears 50, 50ᵃ. It will be understood that the fluid 66 and 66′ substantially fills the bores and ducts, but the total fluid volume is very slightly less than the total fluid capacity of the bores and ducts. This enables free flow of fluid in the ducts and bores and axial movement of the pistons 92, 92ᵃ, 72ᵃ, 72ᵇ, and 76ᵃ, 76ᵇ. The precise difference between the total fluid volume and total fluid capacity is a matter of design and adjustment to be determined by the fluid viscosity and relative sizes of the pistons, bores, ducts, gear teeth, and other mechanical dimensions of the device. Since the pistons 72ᵃ, 72ᵇ and 76ᵃ, 76ᵇ can slip simultaneously past the teeth of gears 50, 50ᵃ, it follows that the rotational speed of drum 42 keyed to driven shaft 44 is less than the rotational speed of cup 37 which is coordinated with the drive shaft 12 through gears 32, 33, 34 and 18, 22, 24, at all speed ratios less than unity. The gears 50 and 50ᵃ have an odd number of teeth so that when the piston 72ᵃ is in the disengaging phase, they will push the fluid through duct 64, thereby forcing the piston 72ᵇ to become engaged with the gear teeth 51 by means of their pawl extensions 74.

Piston 92 intersects, serves as a governor and regulates the flow of this fluid from the fully opened zero position to the complete fully closed position.

While one of the pistons, and only one 72ᵃ or 72ᵇ, is always in driving engagement, the opposition that it offers to gear 50 or 50ᵃ is relative to the opposition offered by the fluid regulated by the piston 92.

It will be apparent that the speed of the driven shaft varies between zero and the speed of the drive shaft. The ratio of the speed of the drive shaft to the speed of the driven shaft thus varies between infinite and unity as the speed of the drive shaft varies from zero to maximum or unity. The invention thus provides for an automatically governed speed transmission between the drive shaft and the loaded driven shaft.

Figure 2:
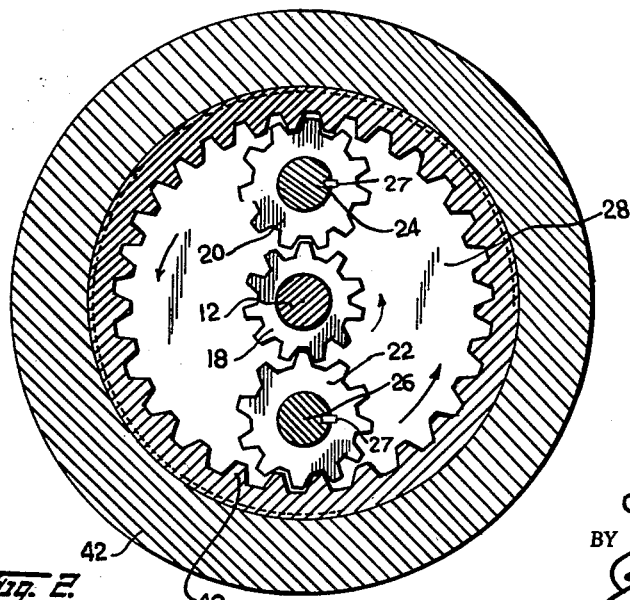

If shaft 12 rotates counterclockwise as viewed in FIGS. 2 and 3, drum 42 rotates counterclockwise also. The shaft 44 and drum 42 cannot rotate faster than shaft 12 and cup 37 due to the ratchet or buttress configuration of the gear teeth 51, 51′. If the shaft 12 should tend to overdrive shaft 44, pinions 20, 22 would rotate in mesh with gear 40 while pinions 30, 32 would rotate in mesh with gear 34, so that a slip clutch effect would be obtained and no further increase in speed of shaft 44 would result. At this maximum speed of shaft 12 the governor pistons would not move any further outward in the bores 90, 90ᵃ, since they would be blocked by the fluid in these bores.

Since satellite pinions 30, 32 are smaller in diameter than pinions 20, 22, the drum 42 and cup 37 will rotate at different speeds. The smaller the difference in pinion diameters, the less the difference in drum and cup speeds.

Due to the difference in diameters between pinions 20, 22 and pinions 30, 32, the cup 37 will rotate at a rate depending on the relative diameters of the larger and smaller pinions. The cup 37 will turn drum 42 through pistons 72ᵃ, 72ᵇ and 76ᵃ, 76ᵇ at a corresponding rate of speed provided the fluid 66, 66′ is locked by operation of the governors.

When the valve members 92, 92ᵃ are wholly or partially clear of ducts 62, 64, pistons 72ᵃ, 72ᵇ and 76ᵃ, 76ᵇ are free to slide in their bores and pumping action is produced by the alternate engaging and disengaging of the pawls 74, 74′ with the gear teeth 51, 51′. When the ducts are slightly closed by the governor valves members 92, 92ᵃ, the pistons will encounter resistance to free sliding motion and will consequently cause the buttress gears 50, 50ᵃ to move slightly. The more that the ducts are closed by the governor valve members, the more resistance is encountered by the pistons to sliding action and the more force is applied to the buttress gears 50, 50ᵃ to rotate.

Since the buttress gears are secured to the drum end 42ᵃ, the drum 42 will rotate at the same speed as the buttress gears. This speed is proportional to the resistance to sliding action encountered by the pistons in the cylindrical bores 70ᵃ, 70ᵇ and 80ᵃ, 80ᵇ. Automatic balancing of forces is provided in the rotating structure since one of the two pistons 72ᵃ, 76ᵃ at one side of the assembly is retracted axially while the other one is extended and one of the other two pistons 72ᵇ, 76ᵇ at the other side of the assembly is extended axially while the other piston of the other two is retracted.

The governors can be arranged so that control is operated either relative to the speed of drive shaft 12 as shown and described herein, or relative to the speed of driven shaft 44, and may be provided with manual means for adjustment other than adjustable screws or plugs 95, 95a. A low pressure oil pump may be provided in association with the rotating cup 36 for keeping the bores and ducts filled with fluid without increasing the resistance to movement of the pistons.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An automatic transmission assembly, comprising a drive shaft, a cup freely mounted on the drive shaft in coaxial alignment therewith, gear means interengaging the drive shaft and cup for rotating the cup, said cup having a pair of diametrally aligned radial bores, a pair of pistons freely movable in the bores respectively, a duct in the cup connecting the bores, fluid filling the duct and bores, a driven shaft coaxial with the drive shaft, a drum secured to and coaxial with the driven shaft, said drum being concentric with the cup, said drum having an internal gear, said pistons having pawls at outer ends thereof engaged with teeth of the internal gear, said internal gear having an odd number of teeth, so that when the pawl of one piston is disposed in a recess between a pair of said teeth, the pawl of the other piston is engaged on a tooth diametrically opposite from said recess, whereby rotation of the drive shaft drives the cup and causes the drum and driven shaft to rotate as the pistons alternately move axially outward and inward of the cup while the fluid is pumped by the pistons from one bore to the other, and governor valve means carried by the cup adjustably restricting flow of fluid in the duct for adjustably varying relative speeds of rotation of the drive and driven shafts.

2. An automatic transmission assembly, comprising a drive shaft, a cup freely mounted on the drive shaft in coaxial alignment therewith, gear means interengaging the drive shaft and cup for rotating the cup, said cup having a pair of diametrally aligned radial bores, a pair of pistons freely movable in the bores respectively, a duct in the cup connecting the bores, fluid filling the duct and bores, a driven shaft coaxial with the drive shaft, a drum secured to and coaxial with the driven shaft, said drum being concentric with the cup, said drum having an internal gear, said pistons having pawls at outer ends thereof engaged with teeth of the internal gear, said internal gear having an odd number of teeth, so that when the pawl of one piston is disposed in a recess between a pair of said teeth, the pawl of the other piston is engaged on a tooth diametrically opposite from said recess, whereby rotation of the drive shaft drives the cup and causes the drum and driven shaft to rotate as the pistons alternately move axially outward and inward of the cup while the fluid is pumped by the pistons from one bore to the other, and governor valve means carried by the cup adjustably restricting flow of fluid in the duct for adjustably varying relative speeds of rotation of the drive and driven shafts, said valve means comprising a further radial bore in the cup, said further bore intersecting said duct, a further piston movable in said further bore, and spring means normally biasing said further piston away from the duct, whereby said further piston moves axially outward to adjustably constrict the duct against tension in said spring as the drive shaft and cup increase in rotational speed.

3. An automatic transmission assembly, comprising a drive shaft, a cup freely mounted on the drive shaft in coaxial alignment therewith, gear means interengaging the drive shaft and cup for rotating the cup, said cup having a pair of diametrally aligned radial bores, a pair of pistons freely movable in the bores respectively, a duct in the cup connecting the bores, fluid filling the duct and bores, a driven shaft coaxial with the drive shaft, a drum secured to and coaxial with the driven shaft, said drum being concentric with the cup, said drum having an internal gear, said pistons having pawls at outer ends thereof engaged with teeth of the internal gear, said internal gear having an odd number of teeth, so that when the pawl of one piston is disposed in a recess between a pair of said teeth, the pawl of the other piston is engaged on a tooth diametrically opposite from said recess, whereby rotation of the drive shaft drives the cup and causes the drum and driven shaft to rotate as the pistons alternately move axially outward and inward of the cup while the fluid is pumped by the pistons from one bore to the other, and governor valve means carried by the cup adjustably restricting flow of fluid in the duct for adjustably varying relative speeds of rotation of the drive and driven shafts, each of the pawls including a freely rotatable roller for smoothly engaging with and disengaging from the successive teeth of the internal gear as the cup rotates with respect to the drum.

4. An automatic transmission assembly, comprising a drive shaft, a cup freely mounted on the drive shaft in coaxial alignment therewith, gear means interengaging the drive shaft and cup for rotating the cup, said cup having a pair of diametrally aligned radial bores, a pair of pistons freely movable in the bores respectively, a duct in the cup connecting the bores, fluid filling the duct and bores, a driven shaft coaxial with the drive shaft, a drum secured to and coaxial with the driven shaft, said drum being concentric with the cup, said drum having an internal gear, said pistons having pawls at outer ends thereof engaged with teeth of the internal gear, said internal gear having an odd number of teeth, so that when the pawl of one piston is disposed in a recess between a pair of said teeth, the pawl of the other piston is engaged on a tooth diametrically opposite from said recess, whereby rotation of the drive shaft drives the cup and causes the drum and driven shaft to rotate as the pistons alternately move axially outward and inward of the cup while the fluid is pumped by the pistons from one bore to the other, and governor valve means carried by the cup adjustably restricting flow of fluid in the duct for adjustably varying relative speeds of rotation of the drive and driven shafts, the teeth of the internal gear being of ratchet type with a radial face and a face inclined to the radial face, each of the pawls being correspondingly shaped to slip past the teeth of the internal gear as the cup rotates with respect to the drum and whereby the drum and driven shaft are prevented from rotating faster than the cup and drive gear.

5. An automatic transmission assembly, comprising a drive shaft, a cup freely mounted on the drive shaft in coaxial alignment therewith, gear means interengaging the drive shaft and cup for rotating the cup, said cup having a pair of diametrally aligned radial bores, a pair of pistons freely movable in the bores respectively, a duct in the cup connecting the bores, fluid filling the duct and bores, a driven shaft coaxial with the drive shaft, a drum secured to and coaxial with the driven shaft, said drum being concentric with the cup, said drum having an internal gear, said pistons having pawls at outer ends thereof engaged with teeth of the internal gear, said internal gear having an odd number of teeth, so that when the pawl of one piston is disposed in a recess between a pair of said teeth, the pawl of the other piston is engaged on a tooth diametrically opposite from said recess, whereby rotation of the drive shaft drives the cup and causes the drum and driven shaft to rotate as the pistons alternately move axially outward and inward of the cup while the fluid is pumped by the pistons from one bore to the other, and governor valve means carried by the cup adjustably restricting flow of fluid in the duct for adjustably varying relative speeds of rotation of the drive and driven shafts, the teeth of the internal gear being of ratchet type with a radial face and a face inclined to the radial face, each of the pawls being correspondingly shaped to slip past the teeth of the internal gear as the cup rotates with respect to the drum and whereby the drum and driven shaft are prevented from rotating faster than the cup and drive gear, each of the pawls including a freely rotatable roller at the free end thereof for smoothly engaging with and disengaging from the successive teeth of the internal gear as the cup rotates with respect to the drum.

6. In an automatic transmission assembly, comprising a drive shaft, a cup freely mounted on the drive shaft in co-axial alignment therewith, gear means interengaging the drive shaft and cup for rotating the cup, said cup having a pair of diametrally aligned radial bores, a pair of pistons freely movable in the bores respectively, a duct in the cup connecting the bores, fluid filling the duct and bores, a driven shaft coaxial with the drive shaft, a drum secured to and coaxial with the driven shaft, said drum being concentric with the cup, said drum having an internal gear, said pistons having pawls at outer ends thereof engaged with teeth of the internal gear, said internal gear having an odd number of teeth, so that when the pawl of one piston is disposed in a recess between a pair of said teeth, the pawl of the other piston is engaged on a tooth diametrically opposite from said recess, whereby rotation of the drive shaft drives the cup and causes the drum and driven shaft to rotate as the pistons alternately move axially outward and inward of the cup while the fluid is pumped by the pistons from one bore to the other, and governor valve means carried by the cup adjustably restricting flow of fluid in the duct for adjustably varying relative speeds of rotation of the drive and driven shafts, the teeth of the internal gear being of ratchet type with a radial face and a face inclined to the radial face, each of the pawls being correspondingly shaped to slip past the teeth of the internal gear as the cup rotates with respect to the drum and whereby the drum and driven shaft are prevented from rotating faster than the cup and drive gear, said valve means comprising a further radial bore in the cup, said further bore intersecting said duct, a further piston movable in said further bore, and spring means normally biasing said further piston away from the duct, whereby said further piston moves axially outward to adjustably constrict the duct against tension in said spring as the drive shaft and cup increase in rotational speed.

7. An automatic transmission assembly, comprising a drive shaft, a sun gear secured to and rotated by said drive shaft, a cup freely rotatable on said drive shaft, said cup having a first internal gear, a disk freely rotatable on said drive shaft, satellite pinions of different sizes rotatably carried by said disk on opposite sides thereof, a drum coaxial with said drive shaft, a driven shaft secured to said drum coaxially with said drive shaft, said drum having another internal gear at one end thereof, said satellite pinions being engaged with the first internal gear in the cup and the second internal gear in the drum for turning the cup and drum when the drive shaft turns, said cup having a first pair of diametrally aligned radial cylindrical bores and a second pair of diametrally aligned radial cylindrical bores respectively parallel to the first pair of bores and spaced therefrom axially of the cup, pistons freely movable in the respective bores, a first duct in the cup connecting the first pair of bores, a second duct in the cup connecting the second pair of bores, two internal toothed ratchet gears axially spaced from each other at the other end of the drum, one of said ratchet gears being aligned with the first pair of bores, the other of said ratchet gears being aligned with the second pair of bores, each ratchet gear having the teeth at diametrically opposite positions offset by one half a tooth, the teeth of the one ratchet gear being also offset from the teeth of the other ratchet gear by one half a tooth circumferentially of the drum, whereby while the pawl of one piston slidably engages on a tooth of either ratchet gear, a pawl of its diametrally opposite piston slidably engages between two teeth of the ratchet gear and a pawl of its adjacent parallel piston engages between two teeth of of the adjacent ratchet gear, said bores and ducts being filled with fluid, whereby rotation of the cup with respect to the drum results in movement of the pistons by the teeth of the ratchet gears and pumping action of the fluid in the bores and ducts as fluid moves out of two bores and into two other bores through respective connecting ducts, and governor valve means in the cup for automatically constricting the ducts so that the pistons yieldably resist displacement by the ratchet gears to cause the drum and driven shaft to rotate with the cup and drive shaft.

8. An automatic transmission assembly, comprising a drive shaft, a sun gear secured to and rotated by said drive shaft, a cup freely rotatable on said drive shaft, said cup having a first internal gear, a disk freely rotatable on said drive shaft, satellite pinions of different sizes rotatably carried by said disk on opposite sides thereof, a drum coaxial with said drive shaft, a driven shaft secured to said drum coaxially with said drive shaft, said drum having another internal gear at one end thereof, said satellite pinions being engaged with the first internal gear in the cup and the second internal gear in the drum for turning the cup and drum when the drive shaft turns, said cup having a first pair of diametrally aligned radial cylindrical bores and a second pair of diametrally aligned radial cylindrical bores respectively parallel to the first pair of bores and spaced therefrom axially of the cup, pistons freely movable in the respective bores, a first duct in the cup connecting the first pair of bores, a second duct in the cup connecting the second pair of bores, two internal toothed ratchet gears axially spaced from each other at the other end of the drum, one of said ratchet gears being aligned with the first pair of bores, the other of said ratchet gears being aligned with the second pair of bores, each ratchet gear having the teeth at diametrically opposite positions offset by one half a tooth, the teeth of the one ratchet gear being also offset from the teeth of the other ratchet gear by one half a tooth circumferentially of the drum, whereby while the pawl of one piston engages on a tooth of either ratchet gear, a pawl of its diametrally opposite piston engages between two teeth of the ratchet gear and a pawl of its adjacent parallel piston engages between two teeth of the adjacent ratchet gear, said bores and ducts being filled with fluid, whereby rotation of the cup with respect to the drum results in movement of the pistons by the teeth of the ratchet gears and pumping action of the fluid in the bores and ducts as fluid moves out of two bores and into two other bores through respectively connecting ducts, and valve means controlling each duct to addjustably cut off fluid flow therethrough so that the pistons adjustably and yieldably resist displacement to cause the drum and driven shaft to rotate at predetermined relative speeds with respect to the rotating cup and drive shaft, the ratio of drive shaft speed to driven shaft speed varying between infinity and unity.

9. An automatic transmission assembly, comprising a drive shaft, a sun gear secured to and rotated by said drive shaft, a cup freely rotatable on said drive shaft, said cup having a first internal gear, a disk freely rotatable on said drive shaft, satellite pinions of different sizes rotatably carried by said disk on opposite sides thereof, a drum coaxial with said drive shaft, a driven shaft secured to said drum coaxially with said drive shaft, said drum having another internal gear at one end thereof, said satellite pinions being engaged with the first internal gear in the cup and the second internal gear in the drum for turning the cup and drum when the drive shaft turns, said cup having a pair of diametrically opposed radial cylindrical bores, pistons freely movable in the bores respectively, a duct in the cup connecting the bores, an internal ratchet gear at the other end of the drum, each of the pistons having a tapered pawl at its axially outer end engaged with teeth of the ratchet gear, the teeth of the ratchet gear being offset from each other diametrally of the drum so that when a pawl of one piston is engaged on a tooth of the ratchet gear a pawl of the other piston is engaged between two adjacent teeth of the ratchet gear and vice versa, said bore and duct being filled with fluid, and governor valve means in the cup for automatically constricting the duct so that the pistons yieldably resist displacement by the ratchet gear to cause the drum and driven shaft to rotate with the cup and drive shaft.

10. An automatic transmission assembly, comprising a drive shaft, a sun gear secured to and rotated by said drive shaft, a cup freely rotatable on said drive shaft, said cup having a first internal gear, a disk freely rotatable on said drive shaft, satellite pinions rotatably carried by said disk on opposite sides thereof, a drum coaxial with said drive shaft, a driven shaft secured to said drum coaxially with said drive shaft, said drum having another internal gear at one end thereof, the satellite pinions on one side of the disk being engaged with the first internal gear in the cup and satellite pinions on the other side of the disk being engaged with the second internal gear in the drum for turning the cup and drum when the drive shaft turns, said cup having a pair of diametrically opposed radial cylindrical bores, pistons freely movable in the bores respectively, a duct in the cup connecting the bores, an internal ratchet gear at the other end of the drum, each of the pistons having a tapered pawl at its axially outer end engaged with teeth of the ratchet gear, the teeth of the ratchet gear being offset from each other diametrally of the drum so that when a pawl of one piston is engaged on a tooth of the ratchet gear a pawl of the other piston is engaged between two adjacent teeth of the ratchet gear and vice versa, said bore and duct being filled with fluid, and governor valve means in the cup for automatically constricting the duct so that the pistons yieldably resist displacement by the ratchet gear to cause the drum and driven shaft to rotate with the cup and drive shaft, said valve means comprising a further radial bore in the cup, said further bore intersecting said duct, a further piston movable in said further bore, and spring means normally biasing said further piston away from the duct, whereby said further piston moves axially outward to adjustably constrict the duct against tension in said spring as the drive shaft and cup increase in rotational speed, whereby the ratio of drive shaft speed to driven shaft speed is adjustably variable between infinity and unity.

11. An assembly according to claim 10, wherein the satellite pinions on one side of said disk are different diameters from the satellite pinions on the other side of said disk.

References Cited by the Examiner
UNITED STATES PATENTS
2,208,224   7/40   Murray.

DON A. WAITE, *Primary Examiner.*